Figure 1:
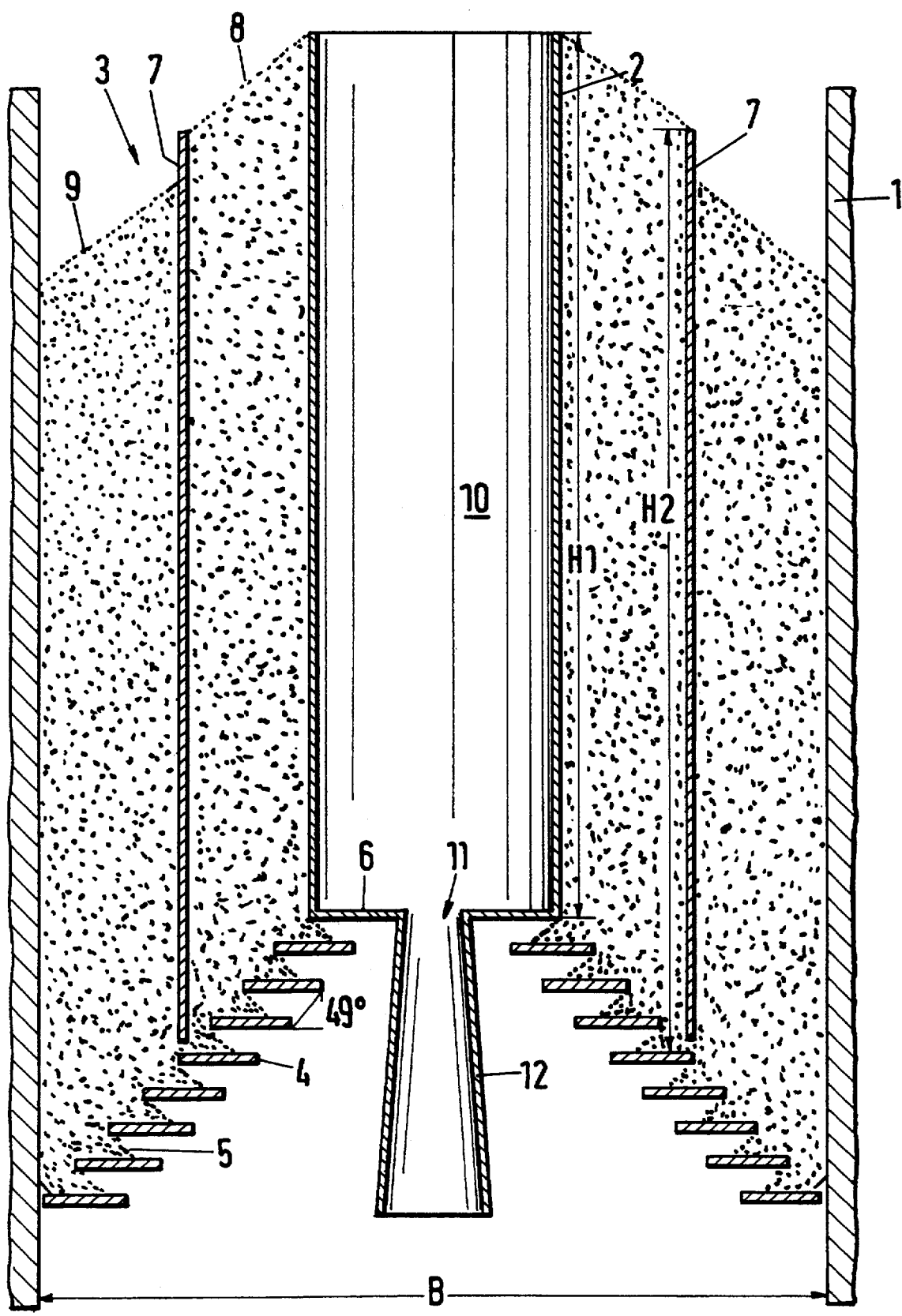

United States Patent [19]
Ritter

[11] Patent Number: 5,371,955
[45] Date of Patent: Dec. 13, 1994

[54] BULK-MATERIAL REACTOR

[75] Inventor: Juergen Ritter, Stuttgart, Germany

[73] Assignee: Nymic Anstalt, Schaan, Liechtenstein

[21] Appl. No.: 39,315

[22] Filed: May 3, 1993

[30] Foreign Application Priority Data

Sep. 3, 1991 [DE] Germany .................. 4129167

[51] Int. Cl.⁵ ........................................... F26B 17/00
[52] U.S. Cl. ................................ 34/580; 34/583; 34/589; 34/171; 34/582; 34/367; 34/168
[58] Field of Search ............... 34/57 A, 57 B, 57 R, 34/10, 576, 580, 582, 583, 585, 586, 588, 589, 359, 367, 369, 370, 165, 168, 171, 174; 432/58

[56] References Cited

U.S. PATENT DOCUMENTS 4,207,292  6/1980  Bischoff et al. ............... 422/232
4,468,868  9/1984  Mull et al. ..................... 34/165
5,305,535  4/1994  Ritter ............................ 34/171

FOREIGN PATENT DOCUMENTS 8401358.3  6/1987  Germany .
3940412A1  2/1991  Germany .
WO91/02586  3/1991  WIPO .

Primary Examiner—Denise L. Gromada
Attorney, Agent, or Firm—Foley & Lardner

[57]  ABSTRACT

A bulk material reactor which has a travelling bed (3) made up of the bulk material held inside a reactor housing (1), with an input assembly (14, 15) on the top and an outlet assembly (4) on the bottom of the travelling bed, a gas supply line (10) and a gas discharge line (18) at different ends of the travelling bed (3), wherein the travelling bed (3) is disposed around a central column (2), the floor (6) of which adjoins the discharge assembly (4), holding the bulk material at an angle of repose; it possesses an advantageous gas supply and can thereby be combined into major reactor assemblies without difficulty, because the interior of the central column (2) constitutes the gas line (10) and the central column (2) has an outlet opening (11) in its floor (6).

12 Claims, 4 Drawing Sheets

BULK-MATERIAL REACTOR

The invention relates to a bulk material reactor which has a travelling bed made up of the bulk material held inside a reactor housing, with an input assembly on the top and an outlet assembly on the bottom, as well as a gas supply line and a gas discharge line at different ends of the travelling bed; the travelling bed is disposed around a central column, the floor of which adjoins the outlet assembly, holding the bulk material at an angle of repose.

A bulk material reactor of this type is known from DE 39 40 412 A1. A central input assembly and the central column result in a symmetrical construction of the travelling bed on both sides of the central column, with the travelling bed forming an angle of repose at the top for the bulk material. The discharge assembly consists of a stepped series of discharge plates, between which the bulk material forms a stable angle of repose. The bulk material is discharged by a swinging motion of the discharge plates which alters the angle at which the bulk material is held and thereby causes it to trickle out. The surfaces of the angle of repose between the discharge plates simultaneously constitute the influx surface for the gas flowing into the reactor from the bottom, which flows in a counter-current through the travelling bed. The graduation of the discharge plates is constructed at an slope which corresponds to the angle of repose of the bulk material at the top of the travelling bed, in order to ensure that the height of the bulk material is as equal as possible for all of the gas influx surfaces.

In order to achieve gas routes of equal length, intermediate walls can be provided in the travelling bed, running parallel to the side walls, with an intermediate wall provided for each discharge plate.

The graduated series of discharge plates adjoin the floor of the central column in such a way that an angle of repose of the bulk material is also formed above the top discharge plates.

In the known bulk material reactor gas is supplied to by means of a gas tank located under a gas intake opening in the floor of the housing. For a combination of several such reactors, common gas supply lines can be provided under the reactor module, in order to combine the reactor modules side wall to side wall. However, the common gas supply lines under the reactor housing would create considerable construction problems in the joining of several bulk material reactors into a single reactor unit, through which a parallel stream of gas would flow, for example.

The invention therefore has the purpose of constructing a bulk material reactor of the type mentioned at the outset in such a way that the gas supply is achieved through a simple construction design and it is possible to easily combine several bulk material reactors into a single reactor unit.

This purpose is achieved in accordance with the invention, in a bulk material reactor of the type mentioned initially, in that the interior of the central column constitutes the gas supply line and the floor of the central column has an outlet opening in it.

In a surprisingly simple fashion, the interior of the central column in the bulk material reactor is used for the gas supply line. This is unusual, because the gas for a counter-current reactor must be supplied under the travelling bed, while the central column is located in the centre of the travelling bed. In accordance with the invention, the gas supply line is connected to the bottom of the travelling bed via an outlet opening in the floor of the central column. In a preferred embodiment, the central column extends over the entire depth of the housing. The outlet opening then also essentially extends over this depth, so that the gas is evenly distributed over the depth of the bulk material reactor.

The evenness of the distribution of gas can be improved by attaching a downward-oriented distributor pipe to the outlet opening in the floor of the central column. This pipe will ensure that the gas is first conducted right to the bottom in the reactor housing and then diverted and rises back up and flows in a counter-current through the travelling bed. In this respect it is advisable if the distributor pipe widens slightly in an cone shape from the free end, and especially if a diversion cone is attached in front of the mouth of the distributor pipe. This makes the gas distribution on the two sides of the central column as even as possible. The slope of the walls of the distributor pipe make it possible to adjust the opening via which the gas leaves the gas supply line. The size of the opening is indirectly proportional to the velocity of the gases, so that the choice of slope of the distributor pipe and the width of the gas outlet opening—and therefore the width of the mouth opening of the distributor pipe—makes it possible to adjust the speed of the flow of gas, which ensures the operation of the distributor pipe as a diffuser.

In an especially preferred embodiment, the travelling bed is edged on the bottom, in a way that is well-known, by cascade-forming graduated discharge plates between which the bulk material forms an angle of repose through which bulk material in a state of rest is prevented from filtering; the discharge plates can be moved back and forth, so that the movement of the discharge plates causes the bulk material to fall down from inside; the distributor pipe extends at least to the area of the lower discharge plates. This arrangement permits an even influx of gas into the travelling bed, with a relatively large influx surface available. This influx surface, which normally amounts to 50% of the empty cross section of the reactor, can be enlarged by giving the graduation of the discharge plates a slope 5° to 15° larger than the angle of repose of the bulk material on the top of the travelling bed. Thus, a preferably greater slope of the graduated plates of about 11° produces an influx surface of 76% of the empty cross section of the reactor. This design permits a very high volume throughput of gas through the travelling bed, as the gas flow into the influx surfaces accelerates only to a very slight degree, and therefore one can operate with relatively high gas speeds without the occurrence of an undesired fluidization effect upon the bulk material on the influx surfaces.

For realistic widths of the travelling bed, it is desirable if at least one intermediate wall, with partial travelling beds on each side of it and its own bulk material angle of repose, is placed in the lateral extension of the travelling bed. These intermediate walls have the function of limiting any route differences which may occur between various gas flow directions in larger travelling beds, so that the period the gas spends in the travelling bed is as even as possible, with the result that, in adsorption reactors, for example, an even purification of the gas is achieved by the adsorption effect of activated carbon filters, for example. To avoid the creation of greatly differing heights of partial travelling beds, in a slope of the graduated discharge plates which exceeds that of the bulk angle of repose, it is desirable to provide a level gauge at the prescribed height for a partial travelling bed lying radially outward from an intermediate wall. This would restrict the differing route length for the gas flowing through—necessitated by the slope of the graduated discharge plates exceeding that of the bulk angle of repose—to the radial depth of the partial travelling bed.

The embodiment of the bulk material reactor in accordance with the invention has the advantage that connections to the gas supply line and the gas outlet line can be located in the same side wall of the housing. In a preferred rectangular, longitudinal embodiment of the housing, which can be about 6 metres long and about 3 metres wide, for example, the connections are preferably located in a small end wall so that several bulk material reactors can be lined up next to each other along their large side walls and can be hooked up to a joint gas supply line which is conducted to the end walls. This arrangement has the further advantage that if one reactor breaks down it can be disconnected from the gas supply line easily and without disrupting the functioning of the other reactors in the reactor assembly, and can be repaired while the other bulk material reactors continue to operate.

In the above-mentioned longitudinal, rectangular embodiment of the bulk material reactor, it is desirable if a drive mechanism to move the discharge plates is attached to the side of the housing opposite to the gas hook-ups. In the housing length of 6 metres mentioned as an example, it can be desirable if the discharge plates are not constructed piece by piece over the entire length, but rather sets of two discharge plates, one behind the other, are constructed, as the latter are easier to manage with drive technology. In this case, the second drive for the jointly driven discharge plates would be located on the opposite side, that is on the side of the gas hook-ups. The drive for the discharge plates can used at the same time to drive the discharge channels which are also swinging and, if required, a swinging distribution plate in the intake assembly.

A preferred embodiment of the bulk material reactor in accordance with the invention provides that two travelling beds with central columns supplying gas are constructed next to one another in the housing of the reactor and that they are separated by an intermediate wall extending to the upper edge of the travelling beds, and have a joint gas collection area which is connection to a joint gas outlet. This embodiment makes possible the advantages described for longitudinal, relatively narrow travelling beds, with the arrangement of the two travelling beds next to each other in one housing achieving a greater and more even throughput than in the construction of a wide travelling bed of equivalent capacity. For a bulk material reactor length of 6 metres, for example, the embodiment of two travelling beds next to one another and two discharge plates each, one behind the other, produces an arrangement of four discharge assemblies, which can be built as a module together with the centre column. The module would then have a cross section size of approximately 3 m × 3 m, resulting in an easily manufactured and easy to handle format, which avoids in particular an overly wide and awkward to handle version of the travelling bed.

Figure 2:
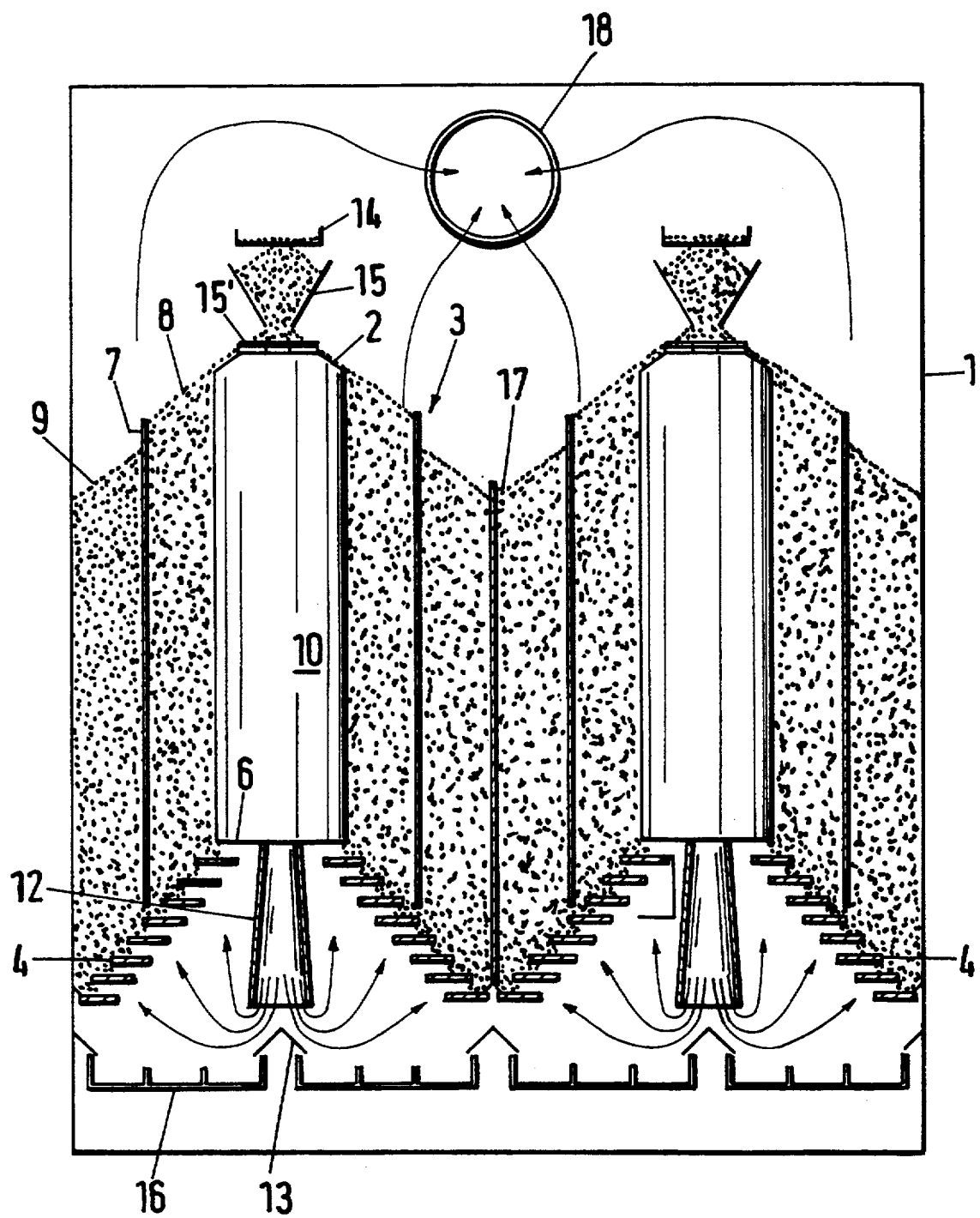
Figure 3:
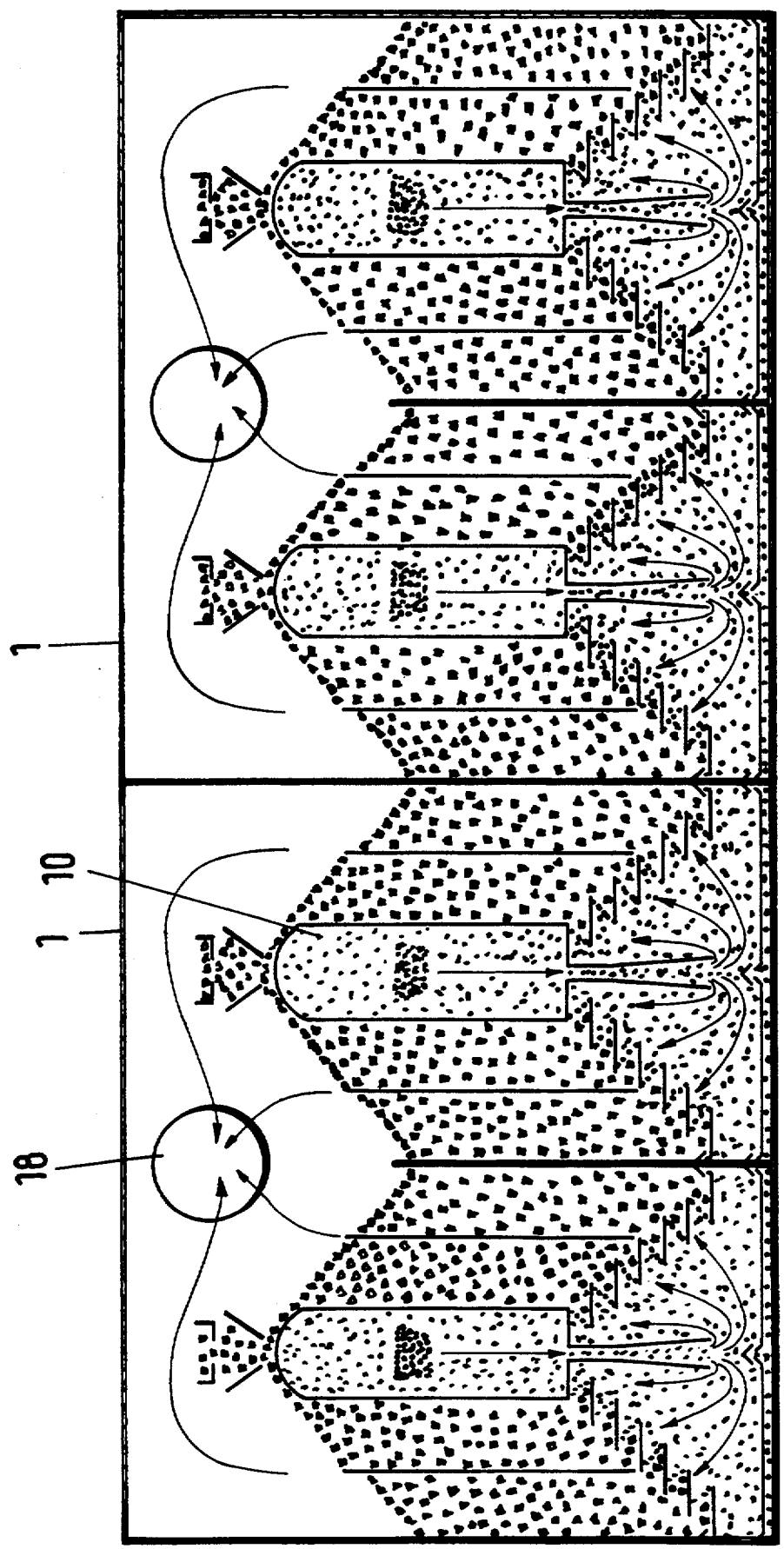
Figure 4:
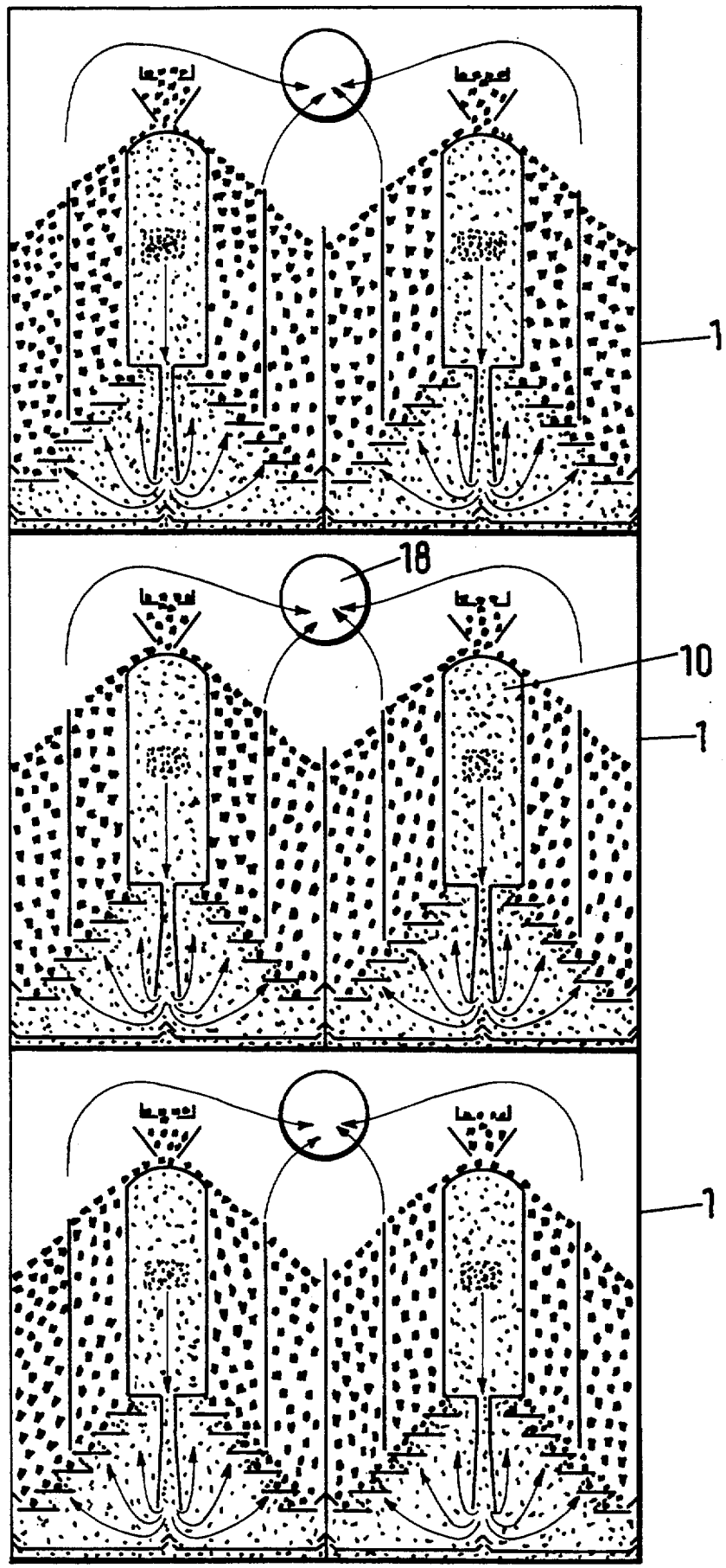

The invention will be described in greater detail below on the basis of the explanatory examples illustrated in the diagram. The following are shown:

FIG. 1—a vertical section through a bulk material reactor in accordance with the invention;

FIG. 2—a bulk material reactor with two travelling beds;

FIG. 3—a reactor arrangement with two reactors as in FIG. 2, arranged next to one another;

FIG. 4—a reactor arrangement with three reactors as in FIG. 2 arranged in a stacked fashion.

FIG. 1 shows a vertical section parallel to the short sides of a rectangular housing 1 of a bulk material reactor and shows a hollow central column 2, which extends over the entire length of the housing 1, and on whose two sides a travelling bed 3 is constructed. The travelling bed 3 is adjoined on the bottom by a discharge assembly formed by discharge plates 4, the discharge plates being graduated and overlapping one another and extending from the central column 2 down to the side wall of the housing 3. In the spaces between the discharge plates 4, the bulk material of travelling bed 3 forms the bulk angle of repose 5, which prevents the bulk material of travelling bed 3 from trickling down through the discharge assembly when the discharge plates are not moving. The to and fro motion of the discharge plates 4 changes the bulk material angle in such a way that the bulk material, depending on the amplitude of the to and fro movement, can be discharged in a controlled way via the discharge plates. The uppermost discharge plates 4 are arranged in an overlapping fashion under a floor 6 of the central column 2, so that a bulk angle of repose 5 is also formed above the uppermost discharge plate 4.

The parts of travelling bed 3 formed on the two sides of the central column 2 are each subdivided by an intermediate wall 7 into two partial travelling beds 8,9, each of which forms its own bulk angle on its top, which is 38° for active carbon, for example. The selected slope of the graduation of the discharge plates 4 in the explanatory example shown is 49°. When the partial travelling beds 8,9 are correctly filled, this angle of 49° is also produced between the bulk material height on the side walls and the top of the intermediate wall 7, as is indicated in the diagram. The larger angle of slope for the graduation of the discharge plates 4 compared to the angle of repose of the bulk material has the effect that the influx surfaces formed by the angle of repose 5 between the discharge plates 4 constitute a total surface, which is considerably larger than in an arrangement of the discharge plates 4 with an angle corresponding to the angle of repose of 38°. While in the latter case an influx surface of about 50% of the empty cross section of the reactor is attainable, in the explanatory examples illustrated a graduation slope of 49° achieves an influx surface of 76% of the empty cross-section surface of the reactor. As can be seen in FIG. 1, the internal filled height of the outer partial travelling bed 9 does not reach the height of the intermediate wall 7. Further filling is prevented by a level gauge (not shown) attached to the outer wall of partial travelling bed 9, in order to limit a differing flow-through length of the gas in the partial travelling beds 8, 9 because of the greater slope of the graduation of the discharge plates 4 as compared to the angle of repose of the bulk material, so that a major difference in length can be avoided over the entire radial depth of the travelling bed 6.

The reactor in accordance with the invention is operated as a counter-current reactor. In accordance with the invention, the interior of the central column 2 is used as a gas supply line 10. This makes it possible to have the gas enter via a gas intake hook-up in a small end of the reactor housing 1. The gas diffuses evenly throughout the depth of the housing 1 by flowing out through an outflow 11 in the floor 6 of the central column 2 and thus enters the area between the discharge plates 4 and their angle of repose of the bulk material 5. A distribution of the supplied gases that is as even as possible is supported by the fact that a distribution pipe is attached to the outlet 11 in the floor 6 of the central column 2, and that the lower end of the distributor pipe extends to the height of the lower discharge plates 4 and broadens conically toward its free end.

As can be seen in FIG. 2, the gas flowing down and out of the distributor pipe 12 is diverted upward, which is reinforced by a diversion cone 13 into which flows the gas emerging from the distributor pipe 12.

FIG. 2 indicates that each travelling bed 3 possesses a bulk material supply line, composed of a swinging supply channel 14, a supply regulator 15 located centrally under it, and a distributor plate 15' located under it. The distributor plate 15', upon which the angles of repose of the bulk material are formed, can be operated by swinging, so that it is possible to adjust the filling of the travelling bed with bulk material.

The bulk material discharged by the discharge plates 4 fall into outlet channels 16, which can also be operated by swinging.

FIG. 2 shows a reactor housing 1, in which two travelling beds 3 are each supplied with their own bulk material input assembly 14, 15, with their own central columns 2 and their own discharge plates 4. The two travelling beds 3 are separated from each other by a dividing wall 17 which extends up to the top of the travelling beds 3. For each of the travelling beds 3, the crude gas is supplied separately via the two central columns 2.

The spaces above the travelling beds are linked with one another and provided with a joint pure gas discharge line 18. The pure gas discharge line will preferably open into a exhaust connection, which is located on the same narrow end of the housing 1.

The drive for the swinging discharge plates 4, the supply channels 14, the distributor plate 15' and the discharge channels 16 should preferably be located on the opposite end.

The overall width B (FIG. 1) of a travelling bed is about 1.3 metres, giving an overall width of about 2.6 metres for the reactor in FIG. 2. A preferred depth is 6 metres.

FIG. 3 makes it clear that two reactors, as are shown in FIG. 2, can be arranged next to one another without intermediate spaces or problems, as the gas connections are located on the back end and can be connected to one another without difficulty, in order to construct an overall arrangement of several reactor housings 1 to increase the quantity of gas flowing through to be processed.

FIG. 4 makes it clear that, in the same way, the arrangement of several reactor housings on top of each other is possible. Naturally, it is also possible to arrange reactor housings beside and above one another, so as to create an extraordinarily productive reactor assembly.

I claim:

1. Bulk material reactor which has a travelling bed (3) made up of the bulk material held inside a reactor housing (1), with an input assembly (14, 15) on the top and an outlet assembly (4) on the bottom of the travelling bed (3), a gas supply line (10) and a gas discharge line (18) at different ends of the travelling bed (3); the travelling bed (3) is disposed around a central column, the floor (6) of which adjoins the outlet assembly (4), holding the bulk material at an angle of repose, characterized by the fact that the interior of the central column (2) constitutes the gas line (10) and that the central column (2) has an outlet opening (11) in its floor (6) and extends over the entire depth of the housing (1).

2. Bulk material reactor in accordance with claim 1, characterized by the fact that a downward-oriented distributor pipe (12) is connected to the outlet opening (11).

3. Bulk material reactor in accordance with claim 2, characterized by the fact that the distributor pipe (12) widens considerably toward the lower end.

4. Bulk material reactor in accordance with claim 2, characterized by the fact that a diversion cone (13) is attached in front of the mouth of the distributor pipe (12).

5. Bulk material reactor in accordance with one of the claim 1, characterized by the fact that the travelling bed (3) is bordered on the bottom by cascade-forming graduated discharge plates (4), between which the bulk material forms an angle of repose (5) which hinders the trickling down of the bulk material in a state of rest, so that the movement of the discharge plates (4) causes the bulk material to fall from them and by the fact that the distributor pipe (12) extends at least to the area of the lower discharge plates (4).

6. Bulk material reactor in accordance with claim 5, characterized by the fact that the graduation of the discharge plates (4) is constructed with a slope which is between 5° and 15° greater than that of the bulk material angle formed on the top of the travelling bed (3).

7. Bulk material reactor in accordance with claim 6, characterized by the fact that the slope of the graduation of the discharge plates (4) is between 10° and 12° greater than the bulk material angle formed on the top of the travelling bed (3).

8. Bulk material reactor in accordance with one of the claim 1, characterized by the fact that at least one intermediate wall (7) is placed in the lateral extension of the travelling bed (3), with partial travelling beds (8, 9) being formed on the two sides of the wall, each with its own bulk material angle.

9. Bulk material reactor in accordance with one of the claim 1, characterized by the fact that connections for the gas supply line (10) and the gas outlet line (18) are located in the same side wall of the housing (1).

10. Bulk material reactor in accordance with claim 5, characterized by the fact that a drive to move the discharge plates (4) is located on the side of the housing (1) opposite to that of the gas hook-ups.

11. Bulk material reactor in accordance with one of the claim 1, characterized by the fact that two travelling beds (3) with central column (2) conducting gas lines are constructed next to each other in one housing (1) and are separated from each other by a dividing wall extending to the upper edge of the travelling beds (3) and have a joint gas collector area, which is linked to a joint gas discharge line (18).

12. Bulk material reactor which has a traveling bed (3) made up of the bulk material held inside a reactor housing (1), with an input assembly (14,15) on the top and an outlet assembly (4) on the bottom of the travelling bed (3), a gas supply line (10) and a gas discharge line (18) at different ends of the travelling bed (3); the travelling bed (3) is disposed around a central column, the floor (6) of which adjoins the outlet assembly (4), holding the bulk material at an angle of repose, characterized by the fact that the interior of the central column (2) constitutes the gas line (10) and that the central column (2) has an outlet opening (11) in its floor (6); the outlet assembly further comprises cascade-forming graduated discharge plates (4) bordering on the bottom of travelling bed (3), between which the bulk material forms an angle of repose (5) which hinders the trickling down of the bulk material in a state of rest, so that the movement of the discharge plates (4) causes the bulk material to fall from them, wherein the graduation of the discharge plates (4) is constructed with a slope which is between 5° and 15° greater than that of the bulk material angle formed on the top of the travelling bed (3); and wherein the reactor further comprises a distributor pipe (12) extending at least to the area of the lower discharge plates (4), and a level gauge which is placed at a prescribed height of fullness for a partial travelling bed (9) placed radially outward of an intermediate wall (7).

* * * * *